US010070151B2

United States Patent
Choi et al.

(10) Patent No.: US 10,070,151 B2
(45) Date of Patent: Sep. 4, 2018

(54) DIGITAL TELEVISION TRANSMITTING/RECEIVER AND METHOD OF PROCESSING DATA IN DIGITAL TELEVISION TRANSMITTER/RECEIVER

(71) Applicant: LG ELECTRONICS INC., Seoul (KR)

(72) Inventors: In Hwan Choi, Gwacheon-si (KR); Kyung Won Kang, Seoul (KR); Kook Yeon Kwak, Anyang-si (KR); Young Jin Hong, Seoul (KR); Sung Ryong Hong, Seongnam-si (KR)

(73) Assignee: LG ELECTRONICS INC., Seoul (KR)

( * ) Notice: Subject to any disclaimer, the term of this patent is extended or adjusted under 35 U.S.C. 154(b) by 660 days.

(21) Appl. No.: 14/597,065

(22) Filed: Jan. 14, 2015

(65) Prior Publication Data

US 2015/0131745 A1 May 14, 2015

Related U.S. Application Data

(63) Continuation of application No. 13/053,017, filed on Mar. 21, 2011, now Pat. No. 8,971,418, which is a (Continued)

(30) Foreign Application Priority Data

Oct. 10, 2005 (KR) .................... 10-2005-0095170

(51) Int. Cl.
 *H04N 7/12* (2006.01)
 *H04N 19/66* (2014.01)
 (Continued)

(52) U.S. Cl.
 CPC .............. *H04N 19/66* (2014.11); *H04B 1/68* (2013.01); *H04N 19/46* (2014.11);
 (Continued)

(58) Field of Classification Search
 CPC .......... H03M 13/2936; H03M 13/2906; H04N 19/597; H04N 21/4382; H04L 1/0041
 (Continued)

(56) References Cited

U.S. PATENT DOCUMENTS

| 7,111,221 B2 * | 9/2006 | Birru .................. H04N 21/4382 714/755 |
| 7,167,212 B2 | 1/2007 | Choi et al. |

(Continued)

FOREIGN PATENT DOCUMENTS

| CN | 1582580 | 2/2005 |
| KR | 1020020089078 | 11/2002 |

(Continued)

OTHER PUBLICATIONS

Korean Intellectual Property Office Application Serial No. 10-2005-0095170, Notice of Allowance dated Nov. 16, 2012, 2 pages.

*Primary Examiner* — Gims S Philippe
(74) *Attorney, Agent, or Firm* — Lee Hong Degerman Kang & Waimey

(57) ABSTRACT

A digital television (DTV) transmitter and a method of coding data in the DTV transmitter method are disclosed. A pre-processor pre-processes the enhanced data by coding the enhanced data for forward error correction (FEC) and expanding the FEC-coded enhanced data. A data formatter generates one or more groups of enhanced data packets, each enhanced data packet including the pre-processed enhanced data. And, a packet multiplexer generates at least one burst of enhanced data by multiplexing the one or more groups of enhanced data packets. Herein, each burst of enhanced data includes at least one group of enhanced data packets. The DTV transmitter may further include a scheduler which
(Continued)

generates first and second control signals to control operations of the data formatter and the packet multiplexer, respectively.

4 Claims, 8 Drawing Sheets

Related U.S. Application Data continuation of application No. 11/428,317, filed on Jun. 30, 2006, now Pat. No. 7,936,828.

(51) Int. Cl.
| | |
|---|---|
| *H04B 1/68* | (2006.01) |
| *H04N 21/236* | (2011.01) |
| *H04N 21/2383* | (2011.01) |
| *H04N 21/262* | (2011.01) |
| *H04N 21/434* | (2011.01) |
| *H04N 21/438* | (2011.01) |
| *H04N 21/6547* | (2011.01) |
| *H04N 19/46* | (2014.01) |

(52) U.S. Cl.
CPC ... *H04N 21/2383* (2013.01); *H04N 21/23614* (2013.01); *H04N 21/262* (2013.01); *H04N 21/4348* (2013.01); *H04N 21/4382* (2013.01); *H04N 21/6547* (2013.01)

(58) Field of Classification Search
USPC ............ 375/265, 301; 714/755; 348/E5.003
See application file for complete search history.

(56) References Cited

U.S. PATENT DOCUMENTS

| | | | |
|---|---|---|---|
| 7,197,685 B2 | 3/2007 | Limberg | |
| 7,337,386 B2* | 2/2008 | Chang | H03M 13/2906 |
| | | | 348/E5.003 |
| 7,756,011 B2 | 7/2010 | Kang et al. | |
| 7,797,607 B2 | 9/2010 | Choi et al. | |
| 8,619,900 B2* | 12/2013 | Jeong | H03M 13/2936 |
| | | | 375/265 |
| 9,131,247 B2* | 9/2015 | Yin | H04N 19/597 |
| 2002/0191712 A1* | 12/2002 | Gaddam | H04L 1/0041 |
| | | | 375/301 |
| 2007/0211769 A1 | 9/2007 | Lee et al. | |

FOREIGN PATENT DOCUMENTS

| | | |
|---|---|---|
| KR | 1020050008432 | 1/2005 |
| WO | 2004/107619 | 12/2004 |

* cited by examiner (a)

(b)

(a)

(b)

(c)

DIGITAL TELEVISION TRANSMITTING/RECEIVER AND METHOD OF PROCESSING DATA IN DIGITAL TELEVISION TRANSMITTER/RECEIVER

CROSS-REFERENCE TO RELATED APPLICATIONS

This application is a continuation of U.S. application Ser. No. 13/053,017, filed on Mar. 21, 2011, now U.S. Pat. No. 8,971,418, which is a continuation of U.S. application Ser. No. 11/428,317, filed on Jun. 30, 2006, now U.S. Pat. No. 7,936,828, which claims the benefit of earlier filing date and right of priority to Korean Patent Application No. 10-2005-0095170, filed on Oct. 10, 2005, the contents of which are all incorporated by reference herein in their entirety.

BACKGROUND OF THE INVENTION

Field of the Invention

The present invention relates to a digital telecommunications system, and more particularly, to a digital television (DTV) transmitter/receiver and a method of processing data in the DTV transmitter/receiver.

Discussion of the Related Art

Since the second half of 1998, the United States of America has adopted an advanced television systems committee (ATSC) 8T-VSB transmission method as the 1995 standard for digital broadcasting. Presently, the Republic of Korea is also providing broadcast programs by adopting the ATSC 8T-VSB transmission method as the standard for broadcasting. Accordingly, experimental broadcasting began in May 1995, and a test-broadcasting system began on Aug. 31, 2000.

FIG. 1 illustrates a conventional ATSC 8T-VSB transmitting system. A data randomizer randomizes MPEG video/audio data that are inputted. A Reed-Solomon (RS) encoder RS-codes data so as to add a 20-byte parity code. A data interleaver interleaves the data. A trellis encoder converts the data from bytes to symbols and, then, trellis-encodes the converted data. A multiplexer (MUX) multiplexes a symbol column and synchronization signals, and a pilot inserter adds a pilot signal to the symbol column. A VSB modulator converts the symbol column to an 8VSB signal of an intermediate frequency bandwidth. And, a radio frequency (RF) converter converts the VSB-converted signal to an RF bandwidth signal and transmits the RF bandwidth-converted signal to an antenna.

FIG. 2 illustrates a structure of a general VSB transmission frame. Herein, one frame consists of two fields, wherein each field includes one field synchronization segment and 312 data segments. The 8T-VSB transmission mode, which is adopted as the standard for digital broadcasting in North America and the Republic of Korea, is a system that has been developed for the transmission of MPEG video/audio data. However, presently, the technology for processing digital signals is being developed at a vast rate, and, as a larger number of the population uses the Internet, digital electric appliances, computers, and the Internet are being integrated. Therefore, in order to meet with the various requirements of the users, a system that can add video/audio data through a digital television channel so as to transmit diverse supplemental information needs to be developed.

Some users may assume that supplemental data broadcasting would be applied by using a PC card or a portable device having a simple in-door antenna attached thereto. However, when used indoors, the intensity of the signals may decrease due to a blockage caused by the walls or disturbance caused by approaching or proximate mobile objects. Accordingly, the quality of the received digital signals may be deteriorated due to a ghost effect and noise caused by reflected waves. However, unlike the general video/audio data, when transmitting the supplemental data, the data that is to be transmitted should have a low error ratio. More specifically, in case of the video/audio data, errors that are not perceived or acknowledged through the eyes or ears of the user can be ignored, since they do not cause any or much trouble. Conversely, in case of the supplemental data (e.g., program execution file, stock information, etc.), an error even in a single bit may cause a serious problem. Therefore, a system highly resistant to ghost effects and noise is required to be developed.

The supplemental data are generally transmitted by a time-division method through the same channel as the MPEG video/audio data. However, with the advent of digital broadcasting, ATSC VSB digital television receivers that receive only MPEG video/audio data are already supplied to the market. Therefore, the supplemental data that are transmitted through the same channel as the MPEG video/audio data should not influence the conventional ATSC VSB receivers that are provided in the market. In other words, this may be defined as ATSC VSB compatibility, and the supplemental data broadcast system should be compatible with the ATSC VSB system. Herein, the supplemental data may also be referred to as enhanced data or E-VSB data. Furthermore, in a poor channel environment, the receiving quality of the conventional ATSC VSB receiving system may be deteriorated. More specifically, resistance to changes in channels and noise is more highly required when using portable and/or mobile receivers.

SUMMARY OF THE INVENTION

Accordingly, the present invention is directed to a digital television (DTV) transmitter and a method of coding data in the DTV transmitter that substantially obviate one or more problems due to limitations and disadvantages of the related art.

An object of the present invention is to provide a digital television system that is suitable for transmitting supplemental data and that is highly resistant to noise.

Another object of the present invention is to provide a digital television system that can enhance a decoding performance of a supplemental data symbol.

Another object of the present invention is to provide a digital television (DTV) transmitter and a method of coding data in the DTV transmitter that can insert known data in a specific area of the supplemental data and transmitting the data to a DTV transmitter/receiver, thereby enhancing the receiving performance of the digital television system.

A further object of the present invention is to provide a digital television (DTV) transmitter and a method of coding data in the DTV transmitter for time-division multiplexing and transmitting enhanced data including main data and known data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital television (DTV) transmitter for coding main and enhanced data for transmission includes a pre-processor for pre-processing the enhanced data by coding the enhanced data for forward error correction (FEC) and expanding the FEC-coded enhanced data, a data formatter for generating one or more groups of enhanced data packets, each enhanced data packet including the pre-processed enhanced data, and a packet multiplexer for generating at least one burst of enhanced data by multiplexing the one or more groups of enhanced data packets, each burst of enhanced data including at least one group of enhanced data packets.

The DTV transmitter may further include a scheduler for generating first and second control signals to control operations of the data formatter and the packet multiplexer, respectively. Herein, the data formatter may generate each group of enhanced data packets according to the first control signal generated by the scheduler. The packet multiplexer may generate each burst of enhanced data according to the second control signal generated by the scheduler. And, the data formatter may insert next burst time information into each group of enhanced data packets. Herein, each group of enhanced data packets may include a plurality of consecutive enhanced data packets. And, each burst of enhanced data may include a plurality of consecutive groups of enhanced data packets.

In another aspect of the present invention, a method of coding main and enhanced data in a digital television (DTV) transmitter includes pre-processing the enhanced data by coding the enhanced data for forward error correction (FEC) and expanding the FEC-coded enhanced data, generating one or more groups of enhanced data packets, each enhanced data packet including the pre-processed enhanced data, and generating at least one burst of enhanced data by multiplexing the one or more groups of enhanced data packets, each burst of enhanced data including at least one group of enhanced data packets.

The method may further include generating first and second control signals to control generation of the one or more groups of enhanced data packets and generation of the at least one burst of enhanced data, respectively. The method may also further include inserting next burst time information into each group of enhanced data packets. Herein, each burst of enhanced data may include a plurality of consecutive groups of enhanced data packets. And, expanding the FEC-coded enhanced data may include inserting a plurality of null bits into the FEC-coded enhanced data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In the present invention, the enhanced data may either consist of data including information such as program execution files, stock information, and so on, or consist of video/audio data. Additionally, the known data refer to data already known based upon a pre-determined agreement between the transmitter and the receiver. Furthermore, the main data consist of data that can be received from the conventional receiving system, wherein the main data include video/audio data.

The present invention relates to inserting known data known by the DTV transmitter/receiver in a specific area of an enhanced data packet and transmitting the processed data packet, thereby enhancing the receiving performance of the DTV receiving system. Most particularly, the present invention relates to multiplexing a plurality of enhanced data packets in group units, thereby multiplexing and transmitting at least one enhanced data packet group in burst units. For simplicity of the description of the present invention, the process of multiplexing at least one enhanced data packet in group units will be referred to as "group multiplexing", and the process of multiplexing at least one enhanced data packet group in burst units will to be referred to as "burst multiplexing". Herein, at least one of only the enhanced data packet groups within one burst may be multiplexed, or at least one enhanced data packet group and main data packets may be multiplexed.

Figure 3:
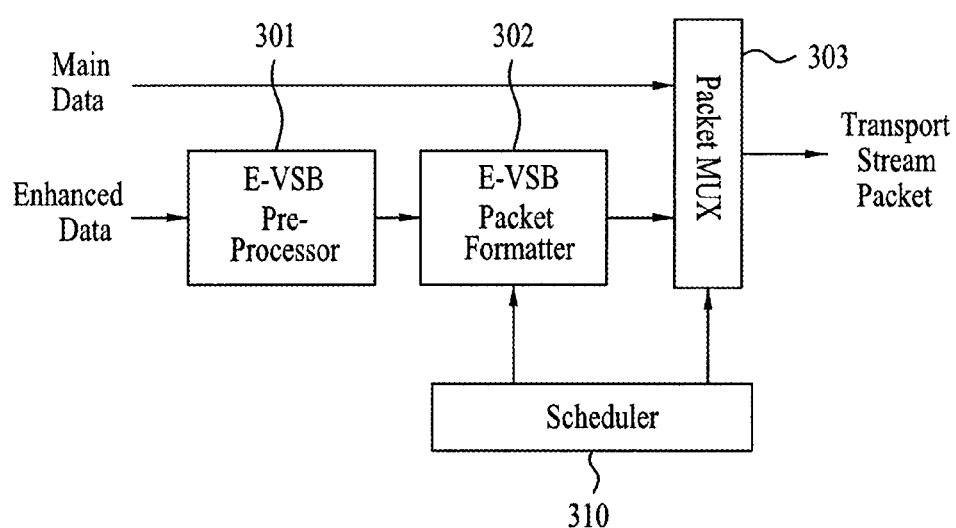
FIG. 3 illustrates a block view of a multiplexing device according to an embodiment of the present invention.

FIG. 3 illustrates a block view of a multiplexing device according to an embodiment of the present invention. The multiplexing device includes an E-VSB pre-processor 301, an E-VSB packet formatter 302, a packet multiplexer 303, and a scheduler 310. In the multiplexing device having the above-described structure, main data are outputted to the packet multiplexer 303 in transport packet units, and enhanced data are outputted to E-VSB pre-processor 301. The E-VSB pre-processor 301 pre-processes the enhanced data, such as encoding additional error correction, interleaving, and inserting null data bits, and then outputs the pre-processed enhanced data to the E-VSB packet formatter 302. The E-VSB packet formatter 302 configures a transport packet with the pre-processed enhanced data and the pre-defined known data, thereby outputting the transport packet to the packet multiplexer 303. At this point, in the enhanced data packet outputted from the E-VSB packet formatter 302, the enhanced data and the known data configure a packet of 184-byte unit, wherein a 4-byte MPEG header is added to the beginning of the packet.

The scheduler 310 controls the packet multiplexer 303, so that the packet multiplexer 303 time-division multiplexes the main data packet and the enhanced data packet in transport stream (TS) packet units and outputs the multiplexed TS packet. More specifically, the scheduler 310 generates a control signal and outputs the generated control signal to the packet multiplexer 303, so that the packet multiplexer 303 can multiplex the main data packet and the enhanced data packet. Accordingly, the packet multiplexer receives the control signal, thereby multiplexing the main data packet and the enhanced data packet to TS packet units and outputting the multiplexed data packet. At this point, based upon the control signal of the scheduler 310, the packet multiplexer 303 multiplexes a plurality of consecutive enhanced data packets in group units and, then, multiplexes and outputs a plurality of groups into burst units.

Figure 4:
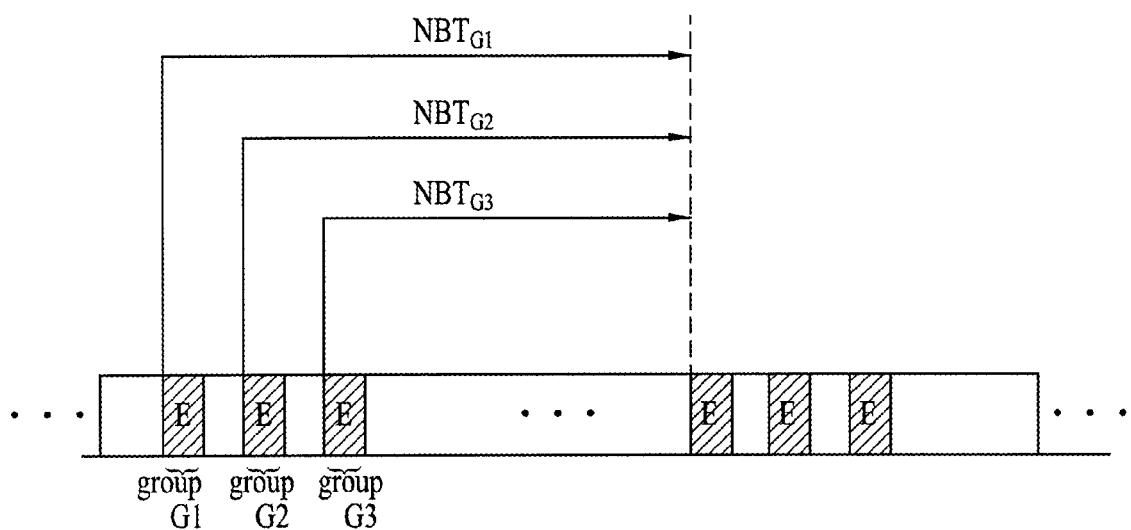
FIG. 4 illustrates examples (a) and (b) of a multiplexing method of the multiplexing device shown in FIG. 3.
Figure 4:
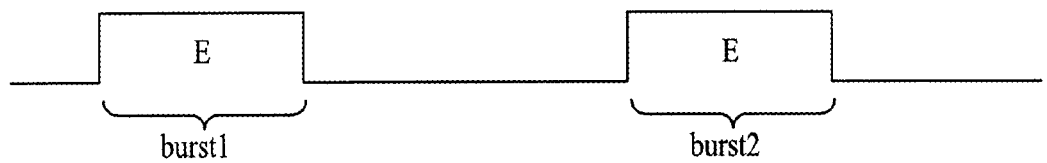

FIG. 4 illustrates examples of a multiplexing method of the multiplexing device. Referring to FIG. 4, a group consists of a plurality of consecutive enhanced data packets, wherein the data packet groups are grouped (or gathered) to form a burst. Herein, the consecutive enhanced data packets are grouped and multiplexed in group units in order to maximize the receiving performance of the receiving system. More specifically, the enhanced data packets are consecutively transmitted in group unit to enable trellis-encoded known data sequences to be long enough to maximize the receiver performance.

If the length of the enhanced data packet group (i.e., the number of enhanced data packets within the group) is too long (or large), a problem of compatibility may occur with the conventional ATSC digital television receiver which receives the main data packet(s). More specifically, the conventional. ATSC digital television receiver refers to a packet identifier (PID) of the enhanced data packet and deletes (or discards) the enhanced data packet accordingly. However, if a main data packet is not received for a long period of time, a problem may occur in the controlling of a buffer. Therefore, according to an embodiment of the present invention, enhanced data packets having a length equal to or shorter than a predetermined length are multiplexed in group units, and the multiplexed data packet group is multiplexed with a main data packet within a burst and then outputted. Meanwhile, the enhanced data packet is transmitted in burst units so as to allow the power of the receiver to be turned on only during the burst period when using a receiver that only receives the enhanced data. This characteristic is advantageous in portable or mobile receivers which require low power consumption.

Furthermore, referring to FIG. 4, a next burst time (NBT) signifies a time starting from each enhanced data packet group within a current burst to the starting time of the following (or next) burst. In the present invention, a next burst time (NBT) is inserted in each group within the current burst and then transmitted. Herein, the NBT is set to be inserted in a pre-decided area of the corresponding group. Such NBT is decided in the scheduler 310 and provided to the E-VSB packet formatter 302. The E-VSB packet formatter 302 then inputs the NBT in a specific area of the enhanced data packet group, which is then outputted. As shown in FIG. 4, the NBT decreases as it proceeds from G1 of the current burst (burst 1) to G2 and G3 (i.e., $NBT_{G1} > NBT_{G2} > NBT_{G3}$). At this point, the NBT is repeatedly inserted within each group in order to allow the receiver to identify the NBT by receiving of another group even when an error occurs during the reception of the corresponding group.

Figure 5:
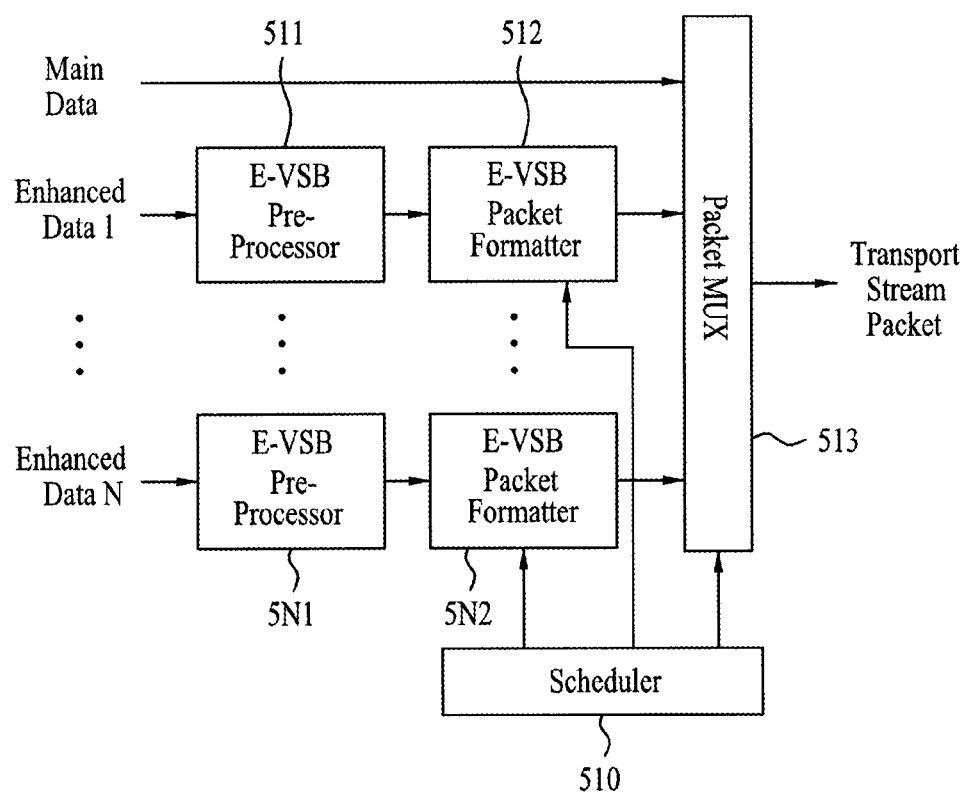
FIG. 5 illustrates a block view of a multiplexing device according to another embodiment of the present invention.

FIG. 5 illustrates a block view of a multiplexing device according to another embodiment of the present invention, wherein the multiplexing device multiplexes different types of enhanced data within the digital television transmitter. Referring to FIG. 5, the number of different types of enhanced data is N. The multiplexing device includes N number of E-VSB pre-processors 511~5N1 and N number of E-VSB packet formatters 512~5N2. More specifically, an E-VSB pre-processor and an E-VSB packet formatter is provided for each corresponding enhanced data type.

The output of each E-VSB packet formatter 512~5N2 is outputted to the packet multiplexer 513. And, in accordance with the control of the scheduler 510, the packet multiplexer 513 multiplexes, in TS units, the enhanced data packets outputted from each of the enhanced packet formatters 512~5N2 and the main data packets and outputs, then, the multiplexed data packets. Herein, the enhanced data packet outputted from each E-VSB packet formatter 512~5N2 may be identified by adding a different PID in each enhanced data packet from each corresponding E-VSB packet formatter 512~5N2. Further, each E-VSB packet formatter 512~5N2 may commonly add a null packet PID in each enhanced data and output the null packet PID-added enhanced data, and each of the enhanced data packets may be identified by using a different method at a fore end of the E-VSB pre-processor.

Figure 6:
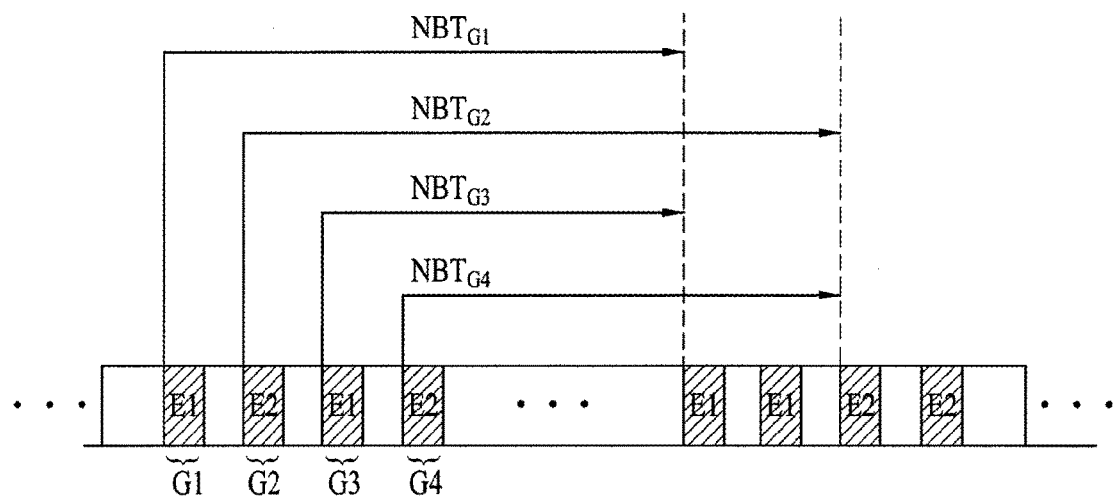
FIG. 6 illustrates examples (a) to (c) of a multiplexing method of the multiplexing device shown in FIG. 5.
Figure 6:
Figure 6:

FIG. 6 illustrates examples of a multiplexing method of the multiplexing device shown in FIG. 5. Referring to FIG. 6, two different types of enhanced data may be outputted as a plurality of enhanced data packets by passing through each E-VSB pre-processor 511 and 521 and each E-VSB packet formatter 521 and 522. Thereafter, the outputted enhanced data packets are multiplexed with the main data packets by the packet multiplexer 513. Herein, each E1 and E2 signifies a first enhanced data group and a second enhanced data group, respectively.

As shown in FIG. 6, each of the first enhanced data and the second enhanced data are multiplexed in group units and then outputted, and each of the burst sections is applied independently in accordance with each enhanced data type. More specifically, among G1, G2, G3, and G4, G1 and G3 correspond to the first enhanced data packet group, and G2 and G4 correspond to the second enhanced data packet group. Therefore, the burst section of the first enhanced data corresponds to the starting point of G1 to the ending point of G3, and the burst section of the second enhanced data corresponds to the starting point of G2 to the ending point of G4. Accordingly, since the first enhanced data burst and the second enhanced data burst are independent from one another, the NBT that is inserted in each enhanced data packet group is applied differently in accordance with the type of the corresponding enhanced data packet group.

In other words, the NBTs that are inserted in the first enhanced data groups G1 and G3 (i.e., $NBT_{G1}$ and $NBT_{G3}$) indicate the time up to the starting point of the next first enhanced data burst. And, the NBT that are inserted in the second enhanced data groups G2 and G4 (i.e., $NBT_{G2}$ and $NBT_{G4}$) indicate the time up to the starting point of the next second enhanced data burst. Either a predetermined value or a real-time variable value may be used for each of the various parameters, such as the next burst time (NBT), each group length, each time from the current group to the next group within a burst, and the burst length. Further, such parameters may be inserted in a pre-decided position (or place) within a group of the E-VSB packet formatter and then transmitted. Alternatively, the parameters may also be inserted and transmitted in a reserved area of an ATSC VSB field synchronization segment.

Figure 7:
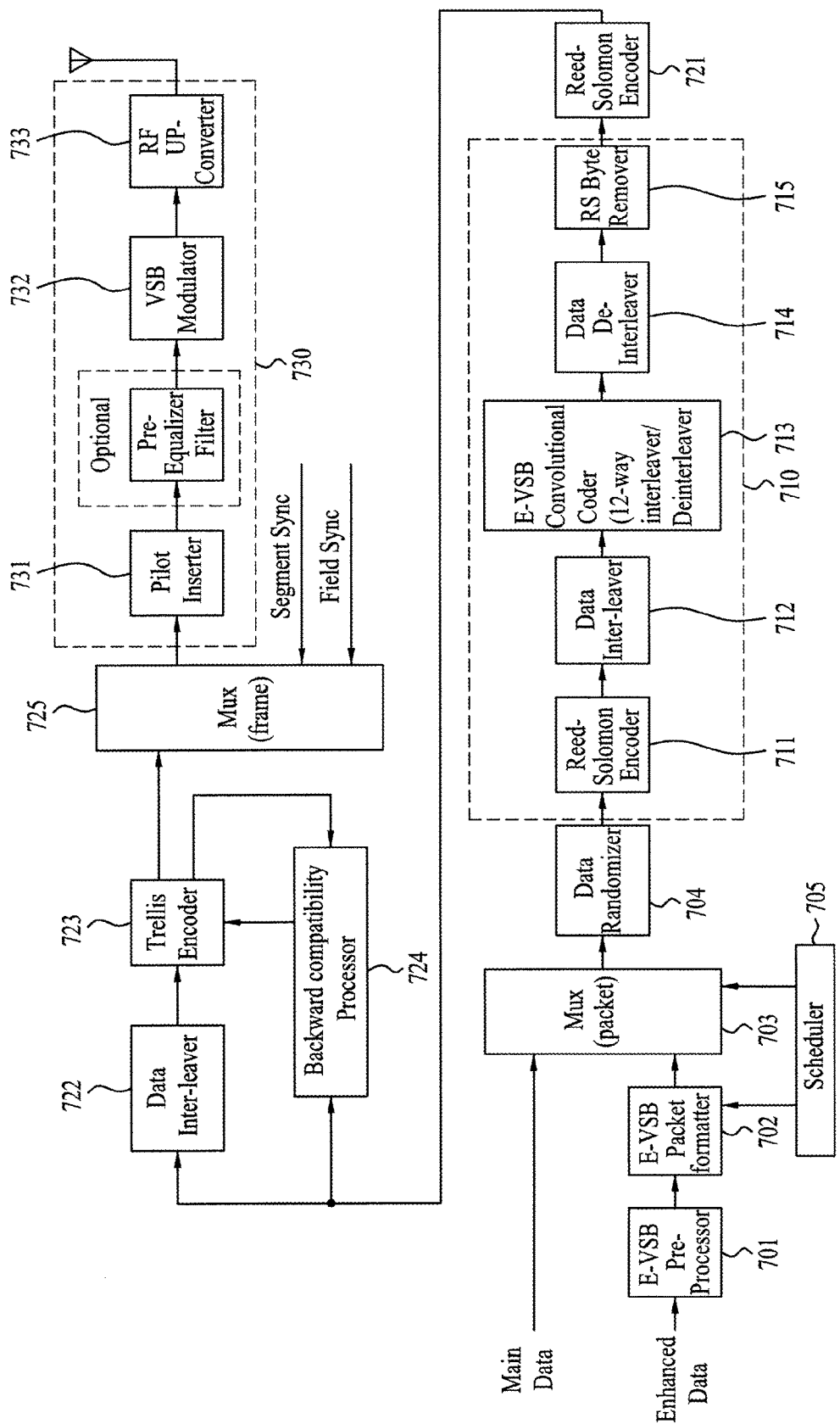
FIG. 7 illustrates a block view of a digital television transmitter according to an embodiment of the present invention.

FIG. 7 illustrates a block view of a digital television transmitter according to an embodiment of the present invention, wherein the multiplexing device of FIG. 3 is applied. The DTV transmitter includes an E-VSB pre-processor 701, an E-VSB packet formatter 702, a packet multiplexer 703, a data randomizer 704, a scheduler 705, an E-VSB post-processor 710, a Reed-Solomon (RS) encoder 721, a data interleaver 722, a trellis encoder 723, a backward-compatibility processor 724, a frame multiplexer 725, and a transmitter 730.

Since the operation of each of the E-VSB pre-processor 701, the E-VSB packet formatter 702, the packet multiplexer 703, the data randomizer 704, and the scheduler 705 has already been described in detail, the description of the same will be omitted for simplicity. The data outputted from the packet multiplexer 703 passes through the data randomizer 704 and are outputted to the E-VSB post-processor 710. Herein, the E-VSB post-processor 710 includes a Reed-Solomon (RS) encoder 711, a data interleaver 712, an E-VSB convolutional encoder 713, a data deinterleaver 714, and a RS byte remover 715. The RS encoder 711 RS-codes the data outputted from the data randomizer 704. Thereafter, the RS encoder 711 adds 20-byte parity data and outputs the data to the data interleaver 712.

The data interleaver 712 interleaves the data packet having the parity data bytes added thereto and being outputted. Thereafter, the data interleaver 712 outputs the interleaved data packet to the E-VSB convolutional encoder 713. Herein, the output data of the data interleaver 712 are outputted to the E-VSB convolutional encoder 713. Then, the E-VSB convolutional-encoded data pass through the data interleaver 714 and are outputted to the RS byte remover 715, thereby removing (or deleting) the 20-byte parity data. The E-VSB convolutional encoder 713 converts the inputted bytes to symbols. Subsequently, E-VSB convolutional-encoding is performed only on the enhanced data symbols, which are then converted back to bytes from symbols so as to be outputted. More specifically, the E-VSB convolutional encoder 713 outputs data without modifying the data when the output of the data interleaver 712 is the main data, or when the output of the data interleaver 712 is the known data that were inserted in the enhanced data packet. Further, the E-VSB convolutional encoder 713 also outputs the MPEG header byte added by the E-VSB packet formatter and the RS parity byte added to the enhanced data packet by the RS encoder 711 without modifying the corresponding data.

The RS byte remover 315 removes the 20-byte parity data, which were added to the corresponding data by the RS encoder 711, and outputs the parity-removed input data to the RS encoder 721. The RS encoder 721 RS-codes the input data so as to add the 20-byte parity data once again to the input data. Then, the RS encoder 721 outputs the parity-added data to the data interleaver 722. The data interleaved by the data interleaver 722 are inputted to the trellis encoder 723. The trellis encoder 723 trellis-encodes the inputted 2 bits to 3 bits and outputs the trellis-encoded data (i.e., 3 bits) to the frame multiplexer 725. In order to make the data outputted from the trellis encoder 723 as the known data defined from the transmitting/receiving ends, a memory within the trellis encoder 723 needs to be initialized with respect to the known data inserted in the E-VSB packet.

Figure 1:
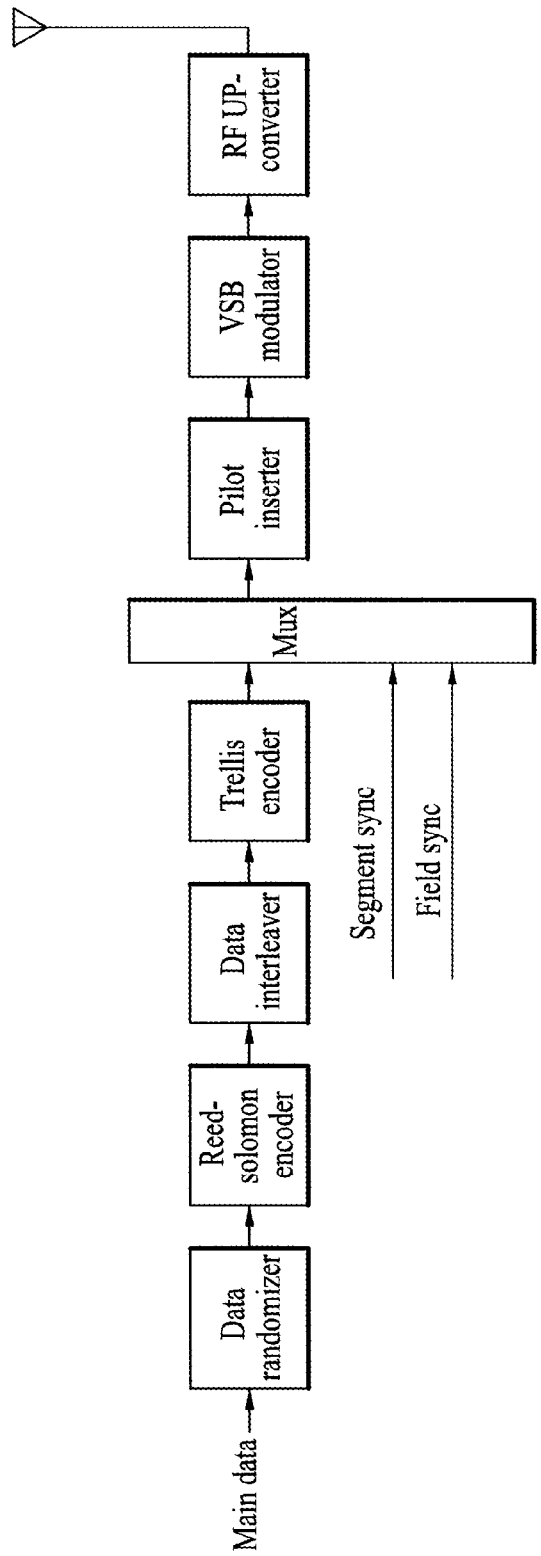
FIG. 1 illustrates a block view of a conventional ATSC 8T-VSB transmitting system.
Figure 2:
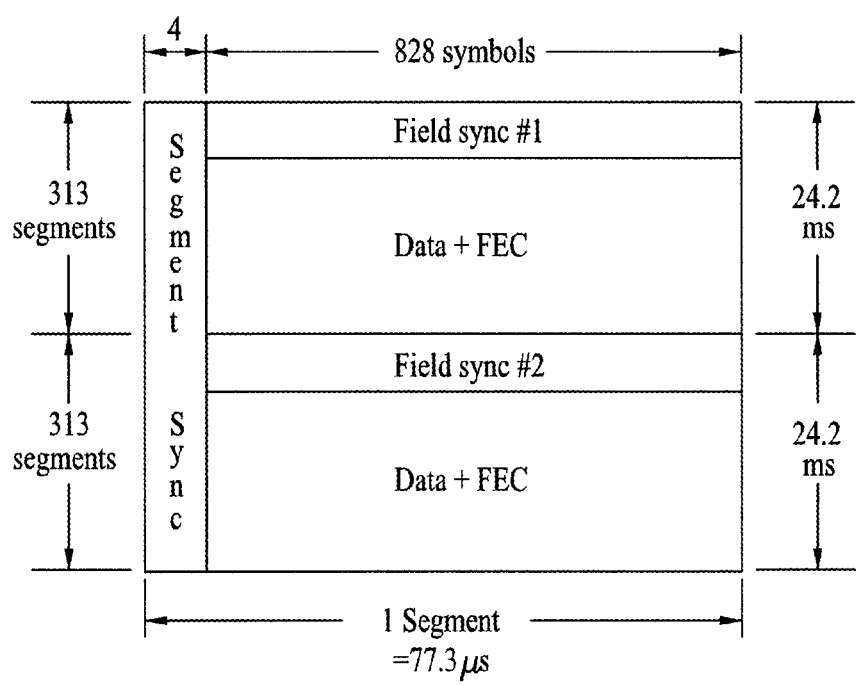
FIG. 2 illustrates a structure of a general VSB transmission frame.

At this point, initialization is performed by a new set of data and not by the input data. Therefore, a new set of RS parity data should be created and be replaced with the initial parity data. More specifically, this operation is performed by the backward-compatibility processor 324. The output of the trellis encoder 723 is inputted to the frame multiplexer 725. Then, the frame multiplexer 725 inserts field and segment synchronization signals to the output data of the trellis encoder 723 and outputs the data to the transmitter 730. Herein, the transmitter 730 includes a pilot inserter 731, VSB modulator 733, and a radio frequency (RF) converter 734. Since this structure is similar to the digital television transmitter of FIG. 1, a detailed description of the same will be omitted for simplicity. As another embodiment of the present invention, the multiplexing device of FIG. 5 may be applied in the digital television transmitter, thereby being capable of multiplexing and transmitting the enhanced data packet and the main data packet.

Figure 8:
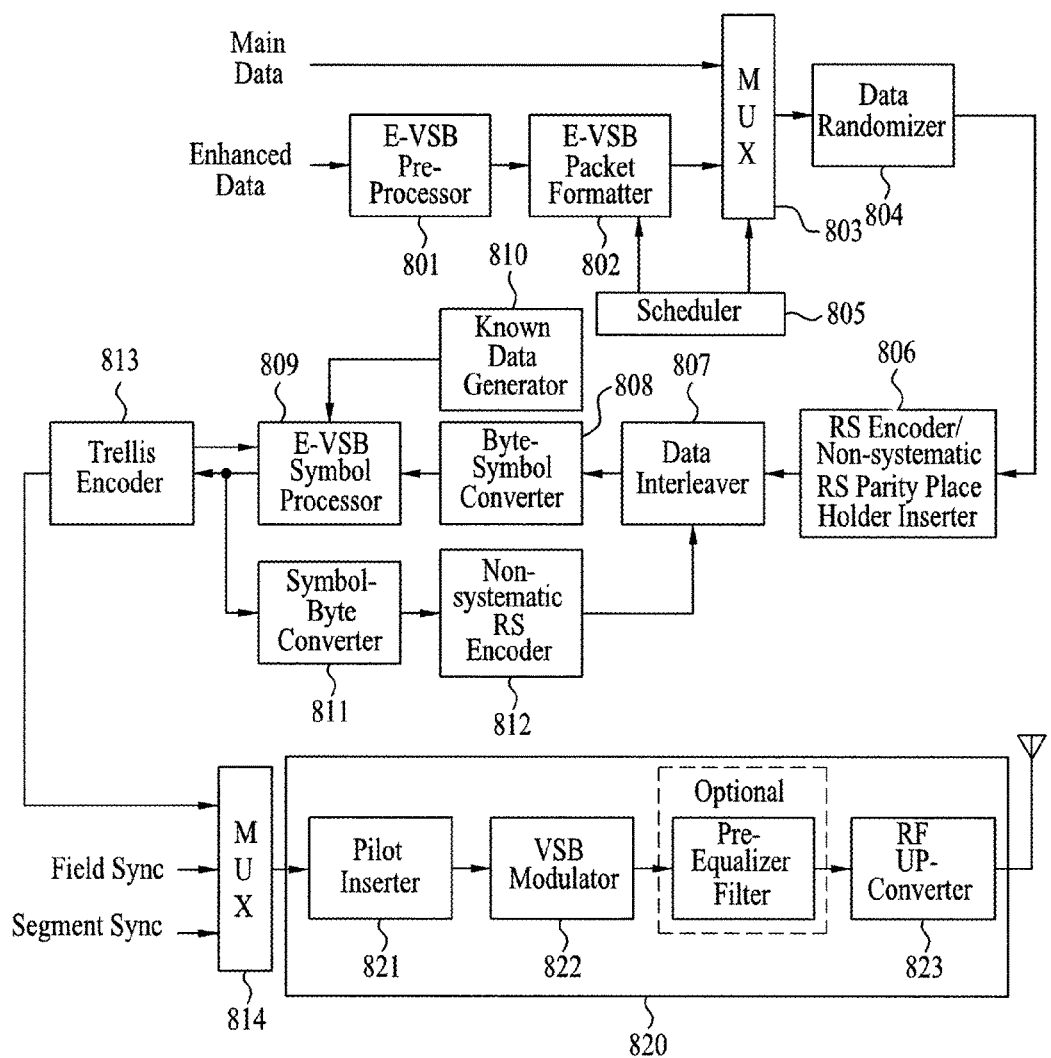
FIG. 8 illustrates a block view of a digital television transmitter according to another embodiment of the present invention.

FIG. 8 illustrates a block view of a digital television transmitter according to another embodiment of the present invention, wherein the multiplexing device of FIG. 3 is applied. The DTV transmitter includes an E-VSB pre-processor 801, an E-VSB packet formatter 802, a packet multiplexer 803, a data randomizer 804, a scheduler 805, a RS encoder/parity place holder inserter 806, a data interleaver 807, a byte-symbol converter 808, an E-VSB symbol processor 809, a known data generator 810, a symbol-byte converter 811, a non-systematic RS encoder 812, a trellis encoder 813, a frame multiplexer 814, and a transmitter 820. The E-VSB packet formatter 802 of FIG. 8 decides the known data place holder in which the known data within the packet is to be inserted. Then, the E-VSB packet formatter 802 inserts a null data bit in the decided known data place holder, thereby configuring a 184-byte packet with the output data of the E-VSB pre-processor 801. Subsequently, a 4-byte MPEG header byte is inserted at the beginning of the configured packet.

Since the operation of each of the packet multiplexer 803 and the scheduler 805 has already been described in detail in the operation of the scheduler of FIG. 3, the description of the same will be omitted for simplicity. The output of the packet multiplexer 803 is randomized by the data randomizer 804. Then, the randomized data are inputted to the Reed-Solomon (RS) encoder/parity place holder inserter 806. The RS encoder/parity place holder inserter 806 processes the randomized data with either a systematic RS-coding process or a non-systematic parity place holder insertion process. More specifically, when the 187-byte packet that is outputted from the data randomizer 804 corresponds to the main data packet, the RS encoder/parity place holder inserter 806 performs the same systematic RS-coding as the conventional ATSC VSB system, thereby adding 20-byte parity data at the end of the 187-byte data.

Conversely, when the 187-byte packet that is outputted from the data randomizer 804 corresponds to the enhanced data packet, a position (or place) of a parity data byte within the packet is decided so that the 20 parity data bytes are outputted from the output terminal of the data interleaver 807 later than the 187 data bytes. Then, a null data byte is inserted in the decided parity byte position (or place).

Further, the 187 data bytes received from the data randomizer 804 are sequentially inserted in the remaining 187 byte positions.

The null data byte is given an arbitrary value, and such null data byte value is substituted with the parity value calculated by the non-systematic RS encoder 811 in a later process. Accordingly, the role of the null data byte is to ensure the parity byte position (or place) of a non-systematic RS code. The non-systematic RS code is used for the enhanced data packet for the following reason. When the value of the enhanced data is changed by the E-VSB symbol processor 809, which will be described in detail in a later process, the RS parity should be recalculated. And so, the parity bytes should be outputted from the data interleaver 807 output terminal later than the data bytes.

The output data of the RS encoder/parity place holder inserter 806 are outputted to the data interleaver 807. Then, the data interleaver 807 interleaves and outputs the received data. At this point, the data interleaver 807 receives a RS parity byte that is newly calculated and outputted by the non-systematic RS encoder 812 and, then, substitutes the newly received RS parity byte for the non-systematic RS parity place holder which is not yet outputted. More specifically, the data interleaved 187 information bytes are first outputted. Thereafter, the 20 parity place holders in which a null data byte is respectively inserted are replaced with the newly calculated 20 RS parity bytes and then outputted.

Each data byte outputted from the data interleaver 807 is converted into 4 symbols by the byte-symbol converter 808, which are then outputted to the E-VSB symbol processor 809. Herein, one symbol consists of 2 bits. Additionally, the known data sequence generated (or created) from the known data generator 810 is also outputted to the E-VSB symbol processor 809. The E-VSB symbol processor 809 receives the data outputted from the byte-symbol converter 808 and the known data symbol generated from the known data generator 810, processes the received data with a plurality of processing steps, and then outputs the processed data to the trellis encoder 813 and the symbol-byte converter 811, respectively. For example, when the data that are outputted from the byte-symbol converter 808 correspond to a known data place holder in which null data are inserted, the E-VSB symbol processor 809 selects the known data generated from the data generator 810 instead of the known data place holder. Then, the E-VSB symbol processor 809 outputs the selected known data to the trellis encoder 813 and the symbol-byte converter 811.

In the portion where the known data symbol begins, the E-VSB symbol processor 809 generates a data symbol that initializes a memory of the trellis encoder 813 to a predetermined state. Thereafter, the E-VSB symbol processor 809 outputs the generated data symbol instead of the known data symbol. In order to do so, the value of the memory in the trellis encoder 813 should be received from the E-VSB symbol processor 809. The trellis encoder 813 is initialized at the beginning of the known data sequence because, even though the known data sequence is inputted as the input of the trellis encoder 813, a plurality of output sequences may be outputted depending upon the memory state of the trellis encoder 813. Therefore, when the known data are inputted after the memory state of the trellis encoder 813 is initialized to a predetermined value, the known data output sequence may be obtained from the output of the trellis encoder 813.

The trellis encoder 813 pre-codes the data that are inputted as the upper bit among the output symbol of the E-VSB symbol processor 808, and trellis-encodes the data that are inputted as the lower bit. Thereafter, the pre-coded data and the trellis-encoded data are outputted to the frame multiplexer 814. Meanwhile, the E-VSB symbol processor 809 receives the symbol consisting of 2 bits, processes the received symbol with a plurality of process steps, and outputs the processed symbol. Therefore, the symbol should be converted back to data bytes from the symbol-byte converter 811 so that the non-systematic RS encoder 812 can recalculate the RS parity from the output of the E-VSB symbol processor 809. The non-systematic RS encoder 812 calculates the 20-byte RS parity for the data packet configured of 187 information bytes and outputs the calculated RS parity to the data interleaver 807.

The frame multiplexer 814 inserts 4 segment synchronization symbols in each 828 output symbols of the trellis encoder 813, thereby configuring a data segment having 832 data symbols. More specifically, one field synchronization segment is inserted in each 312 data segments, so as to configure one data field, which is then outputted to the transmitter 820. Herein, the transmitter 820 includes a pilot inserter 821, a VSB modulator 822, and a radio frequency (RF) converter 823. Since this structure is similar to the digital television transmitter of FIG. 1, a detailed description of the same will be omitted for simplicity. As another embodiment of the present invention, the multiplexing device of FIG. 5 may be applied in the DTV transmitter, thereby being capable of multiplexing and transmitting the enhanced data packet and the main data packet.

As described above, the digital television (DTV) transmitter and the method of coding data in the DTV transmitter according to the present invention have the following advantages. Herein, the digital television system is highly protected against (or resistant to) any error that may occur when transmitting supplemental data through a channel, and the digital television system is also highly compatible to the conventional VSB system. The present invention may also receive the supplemental data without any error even in channels having severe ghost effect and noise. Additionally, by inserting known data in a specific area of the data area and transmitting the processed data, the receiving performance of the receiving system liable to a frequent change in channel may be enhanced. Furthermore, the present invention is even more effective when applied to mobile and portable receivers, which are also liable to a frequent change in channel and which require protection (or resistance) against intense noise.

Finally, by grouping a plurality of consecutive enhanced data packets and transmitting the grouped packets, the receiving performance of the receiving system may be enhanced. More specifically, by transmitting at least one group in burst units, the function of a receiving system receiving only the enhanced data. The transmission of the grouped packets in burst units is even more effective when applied to mobile and portable receivers, which are also liable to a frequent change in channel and which require protection (or resistance) against intense noise.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of transmitting broadcast data by a transmitter, the method comprising:
performing, by a first processor, first encoding on supplemental data that are not audio data and/or video data;

adding, by a second processor, data having a value to the first-encoded supplemental data;

performing, by an encoder, second encoding on the supplemental data to which the data having the value are added;

removing, by a remover, the data having the value in the second-encoded supplemental data;

interleaving, by an interleaver, the supplemental data in which the data having the value are removed and the audio data and/or the video data; and transmitting, by a transmitting unit, a frame including the interleaved data, wherein at least one synchronization symbol is positioned at a start of the frame to enable synchronization.

2. The method of claim 1, further comprising:

converting, by a converter, the supplemental data to supplemental data symbols.

3. A transmitter for transmitting broadcast data, the transmitter comprising:

a first processor to perform first encoding on supplemental data that are not audio data and/or video data;

a second processor to add data having a value to the first-encoded supplemental data;

an encoder to perform second encoding on the supplemental data to which the data having the value are added;

a remover to remove the data having the value in the second-encoded supplemental data;

an interleaver to interleave the supplemental data in which the data having the value are removed and the audio data and/or the video data; and a transmitting unit to transmit a frame including the interleaved data, wherein at least one synchronization symbol is positioned at a start of the frame to enable synchronization.

4. The transmitter of claim 3, further comprising:

a converter to convert the supplemental data to supplemental data symbols.

* * * * *